(12) United States Patent
Camp et al.

(10) Patent No.: US 7,748,755 B2
(45) Date of Patent: Jul. 6, 2010

(54) COUPLINGS FOR WATER FED POLES

(75) Inventors: Robert Camp, Bethany, CT (US); David Rogers, Newport (GB); Matthew Hodgkins, Blackwood (GB)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 11/873,702

(22) Filed: Oct. 17, 2007

(65) Prior Publication Data

US 2008/0105765 A1  May 8, 2008
US 2009/0072053 A2  Mar. 19, 2009

Related U.S. Application Data

(63) Continuation of application No. PCT/US2006/000475, filed on Jan. 6, 2006.

(51) Int. Cl.
*F16L 15/00* (2006.01)
(52) U.S. Cl. .................. 285/391; 285/148.21; 239/532
(58) Field of Classification Search ................. 285/332, 285/332.1, 332.2, 332.3, 148.19, 148.21, 285/148.1, 31, 27, 391; 239/532
See application file for complete search history.

(56) References Cited

U.S. PATENT DOCUMENTS

| | | | |
|---|---|---|---|
| 1,277,805 A | 9/1918 | Wingers | |
| 1,591,264 A * | 7/1926 | Baash | 294/86.23 |
| 2,339,135 A | 1/1944 | Baume | |
| 2,661,966 A | 12/1953 | Edelen | |
| 2,789,865 A * | 4/1957 | Shannon | 239/723 |
| 2,907,589 A | 10/1959 | Knox | |
| 3,722,903 A | 3/1973 | Jones | |
| 4,353,580 A | 10/1982 | Houck | |
| 4,473,131 A | 9/1984 | Clegg et al. | |
| 4,475,623 A | 10/1984 | Gerber et al. | 181/243 |
| 4,615,547 A | 10/1986 | Sutcliffe et al. | |
| 4,666,192 A | 5/1987 | Zamora | |
| 4,768,258 A | 9/1988 | Langenstein | 16/115 |
| 4,844,211 A | 7/1989 | Nosse et al. | |
| 5,007,753 A | 4/1991 | England, Jr. | 401/139 |
| 5,407,293 A | 4/1995 | Crainich | 403/322 |

(Continued)

OTHER PUBLICATIONS

International Search Report dated May 8, 2007 for PCT Application No. PCT/US06/00475.

(Continued)

*Primary Examiner*—Aaron M Dunwoody
(74) *Attorney, Agent, or Firm*—Ohlandt, Greeley, Ruggiero & Perle, LLP

(57) ABSTRACT

A coupling for joining a first pole section and a second pole section is provided. The coupling includes a male portion secured to the first pole section and a female portion secured to the second pole section. The male portion has a first male guide, a second male guide, and a first threaded section between the first and second male guides. The female portion has a first female guide, a second female guide, and a second threaded section between the first and second female guides. The guides are spaced from one another and from the first and second threaded sections so that the first male and female guides are engaged with one another and the second male and female guides are engaged with one another before the threaded sections engage with one another.

16 Claims, 8 Drawing Sheets

U.S. PATENT DOCUMENTS

| | | |
|---|---|---|
| 6,554,213 B2 | 4/2003 | Chen .................... 239/394 |
| 6,588,683 B1 | 7/2003 | Chen .................... 239/532 |
| 6,619,570 B1 | 9/2003 | Ericksen et al. .......... 239/532 |
| 6,719,331 B1 | 4/2004 | Chen .................... 285/302 |
| 2003/0180085 A1 | 9/2003 | Hughes ................. 401/289 |
| 2004/0195355 A1 | 10/2004 | Bolyard, Jr. et al. ....... 239/128 |
| 2004/0239113 A1 | 12/2004 | Hefele et al. ............ 285/333 |

OTHER PUBLICATIONS

Written Opinion dated May 8, 2007 for PCT Application No. PCT/US06/00475.

* cited by examiner

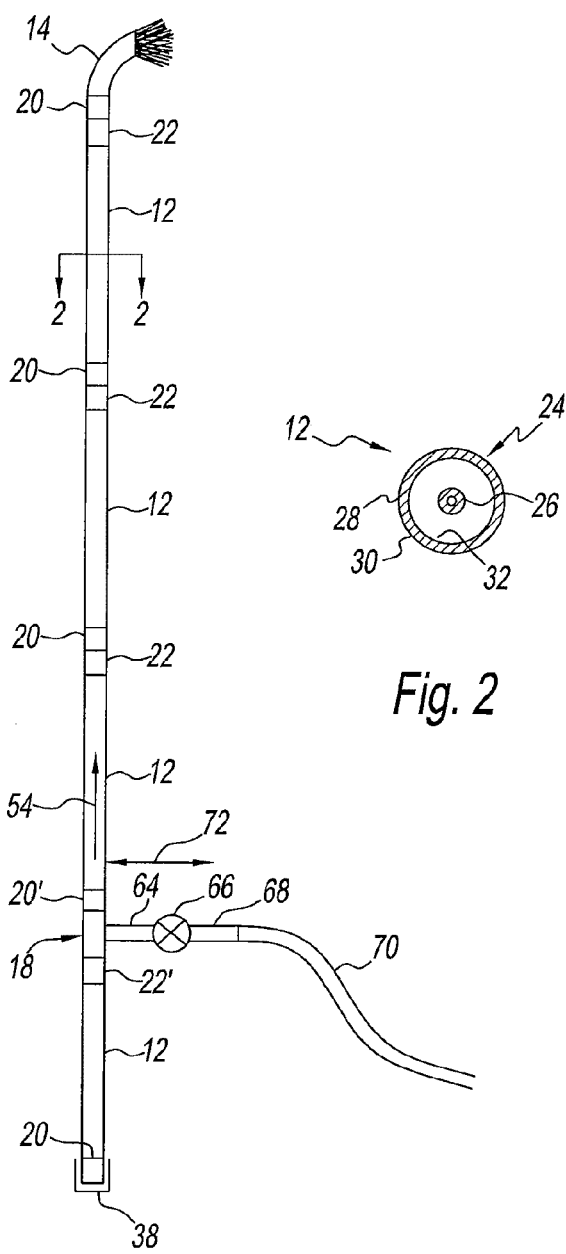
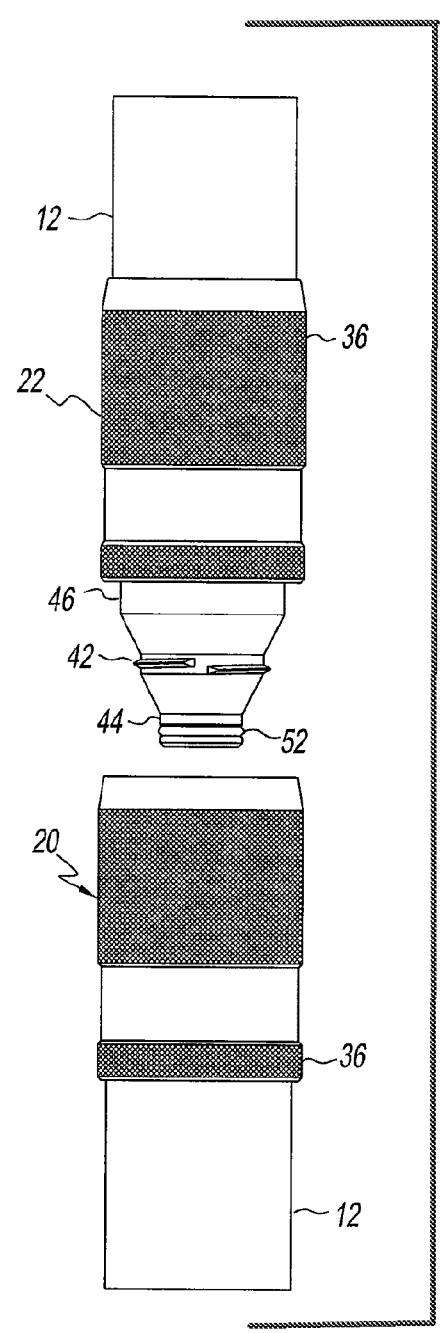
Fig. 1
Fig. 2
Fig. 3

COUPLINGS FOR WATER FED POLES

CROSS REFERENCE TO RELATED APPLICATIONS

This application is a continuation of International Application No. PCT/US2006/000475 filed Jan. 6, 2006, now pending.

BACKGROUND OF THE INVENTION

1. Field of the Invention

The present disclosure is related to water fed poles. More particularly, the present disclosure is related to couplings for water fed poles.

2. Description of Related Art

The access to windows in buildings having a height up to about five stories for purposes of cleaning those windows can present a unique problem. These buildings are typically too small for window cleaning methods where the person cleaning the window is suspended from the top of the building and lowered to the windows. In addition, these buildings are typically too large for window cleaning methods where the person cleaning the window uses a ladder or other structure to climb up to the windows.

It has therefor become common to use a pole cleaning method for cleaning such windows. In pole cleaning methods, a pole having a cleaning implement at one end is used. The cleaning implement can include devices such as, but not limited to, a brush, a sponge, a wiper blade, a scraper, and any combinations thereof. Water and/or cleaning fluid (hereinafter "water") is fed through the pole to the cleaning device for cleaning the windows. The water fed pole can then be used to move the cleaning device against the window to clean the window.

Water fed poles typically come in five-foot sections that can be removably secured to one another to the desired length. During use, the window cleaner assembles a plurality of pole sections to one another until the desired pole length is reached and then secures a water feed to the pole. The window cleaner moves the assembled pole to an erect or upright position, begins cleaning the windows at the top of the building, and works their way down to the bottom of the building by removing pole sections from the bottom of the pole. At each point where a section of the assembled pole is removed, the cleaner must first disconnect the water feed, remove a pole section, and then reconnect the water feed to the bottom section.

The cleaner typically maintains the assembled pole in the upright position, while performing these actions. Thus, the ease with which the pole sections and water source can be disconnected from one another greatly effects the utility and efficiency of the pole. In addition, the weight of the assembled pole effects the utility of the pole. The heavier the pole and the more difficult the removal of pole sections becomes, the more difficult and tiresome its use becomes.

Conversely, the height of the assembled pole makes a secure connection between pole sections important to avoid inadvertent disconnection of the pole sections during use.

Accordingly, there is a continuing desire for couplings for water fed poles that overcome, mitigate and/or alleviate one or more of the above described and other deleterious effects of the prior art poles.

BRIEF SUMMARY OF THE INVENTION

It is an object of the present disclosure to provide easy to use couplings for water fed poles.

It is another object of the present disclosure to provide couplings that increase the ease of use by mitigating cross threading and/or requiring only about two turns for complete engagement or assembly.

It is another object of the present disclosure to provide an easy to use water fed fitting for water fed poles.

These and other objects and advantages of the present disclosure are provided by a coupling for joining a first pole section and a second pole section. The coupling includes a male portion secured to the first pole section and a female portion secured to the second pole section. The male portion has a first male guide, a second male guide, and a first threaded section between the first and second male guides. The female portion has a first female guide, a second female guide, and a second threaded section between the first and second female guides. The guides are spaced from one another and from the first and second threaded sections so that the first male and female guides are engaged with one another and the second male and female guides are engaged with one another before the threaded sections engage with one another.

A coupling for joining a first pole section and a second pole section is also provided that includes a male portion, a female portion, a water port, and a water diverter. The male portion has a first male guide, a second male guide, and a first threaded section between the first and second male guides. The female portion has a first female guide, a second female guide, and a second threaded section between the first and second female guides. The water diverter is between the male and female portions so that the water port is in fluid communication with either the male portion or the female portion.

A water fed pole is provided that includes a plurality of pole sections, a male coupling portion secured to a first end of each of the plurality of pole sections, and a female coupling portion secured to a second end of each of the plurality of pole sections. The male portion has a first male guide, a second male guide, and a first threaded section between the first and second male guides. The female portion has a first female guide, a second female guide, and a second threaded section between the first and second female guides. The guides are spaced from one another and from the threaded sections so that the first male and female guides of adjacent pole sections are engaged with one another and the second male and female guides are engaged with one another before the first and second threaded sections engage with one another.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 1 illustrates an exemplary embodiment of a water fed pole according to the present disclosure;

FIG. 2 is a sectional view of the pole of FIG. 1, taken along lines 2-2.

FIG. 3 is an exploded view of an exemplary embodiment of a coupling according to the present disclosure for use with the pole of FIG. 1;

DETAILED DESCRIPTION OF THE INVENTION

Figure 4:
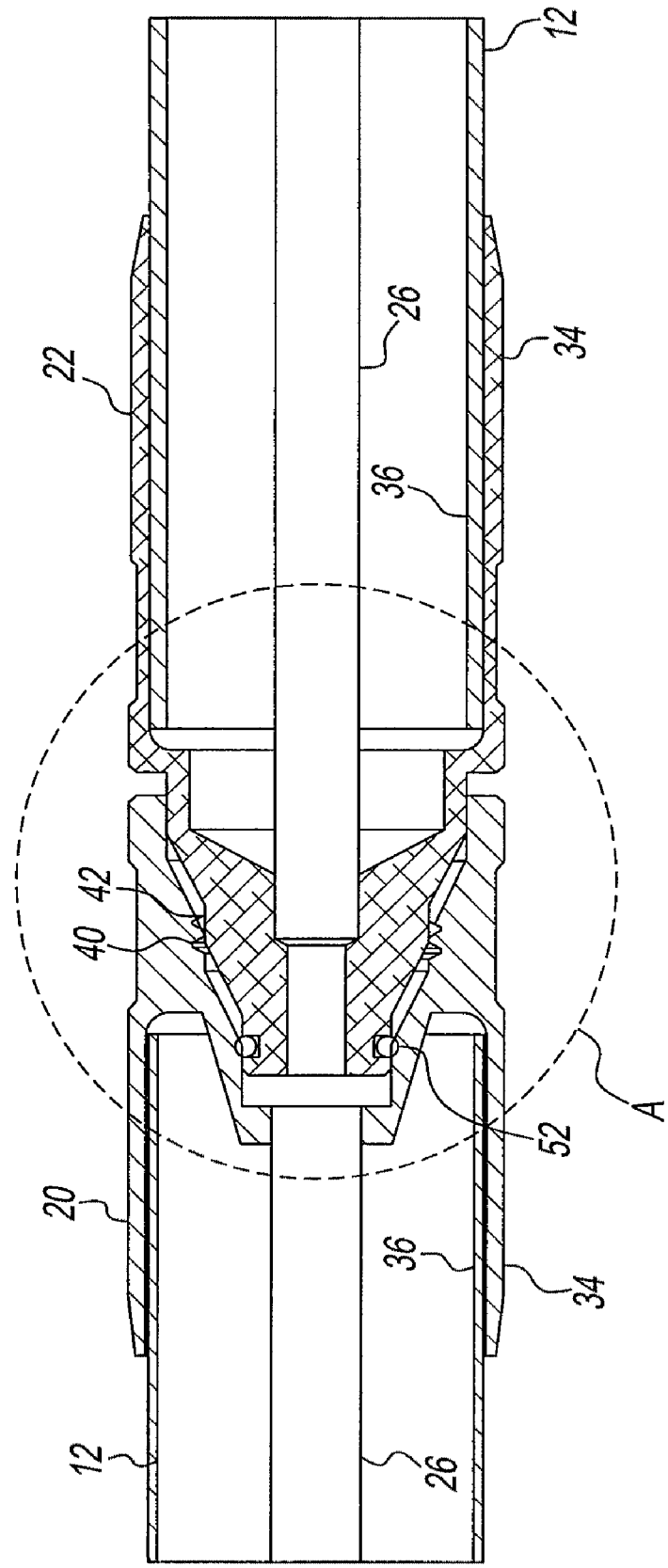
FIG. 4 is a sectional view of the coupling of FIG. 3 prior to engagement of the threaded sections.

Referring to the drawings and in particular to FIG. 1, an exemplary embodiment of a water fed pole according to the present disclosure is generally illustrated by reference numeral 10. Pole 10 includes a plurality of sections 12, a cleaning implement 14, a plurality of couplings 16, and a water fed fitting 18. Advantageously, pole 10 has an easy to use coupling 16 that prevents cross threading of the sections and water fed fitting 18 that improves the ease of use of the pole.

Each coupling 16 includes a female portion 20 and a male portion 22. Each female portion 20 is secured to one end of a section 12, and the male portion 22 is secured to the opposite end of that section. Thus, multiple sections 12 can be removably connected to one another in a fluid tight manner by simply securing corresponding female and male portions 20, 22 of adjacent sections 12. Coupling 16 can be formed of a strong, lightweight metallic material such as, but not limited to, steel, aluminum, titanium, and alloys thereof. In a preferred embodiment, coupling 16 is formed of anodized aluminum.

Cleaning implement 14 can include devices such as, but not limited to, a brush, a sponge, a wiper blade, a scraper, and any combinations thereof. In the illustrated embodiment, cleaning implement 14 is illustrated as a cleaning brush. Cleaning implement 14 can include a female portion 20 so that the cleaning implement can be removably connected to a male portion 22 of section 12 in a fluid tight manner.

Each section 12 can have a length of between about 1 foot (0.30 meters) to about 10 feet (3.0 meters), preferably, between about 2.5 feet (0.75 meters) to about 5 feet (1.50 meters), and any subranges therebetween. In some embodiments of the present disclosure, sections 12 can be provided in a range of lengths so that the assembled pole 10 can be provided to any desired length.

A plurality of sections 12 can be removably secured to one another by couplings 16 to provide pole 10 with an overall length of between about 2.5 feet (0.75 meters) to about 50 feet (15 meters). In this manner, pole 10 can be used to position cleaning implement 14 for cleaning windows up to about five stories high.

Sections 12 of pole 10 are described in detail with reference to FIGS. 1 through 3. Each section 12 has a hollow shell 24 surrounding a water tube 26. Hollow shell 24 has a generally circular cross-section and can be made of a composite system comprising a plurality of fibers solidified in an epoxy-based resin. For example, shell 24 can be made of fibers such as, but not limited to, glass fibers, polyaramid fibers, carbon fibers, and any combinations thereof. Shell 24 includes a core 28 and an outer sheath 30. Outer sheath 30 is, preferably, made of electrically non-conductive fibers to render section 12 electrically non-conductive.

Shell 24 can also include an inner sheath 32 made of material sufficient to prevent corrosion between the fibers of core 28 and the material of couplings 16. In a preferred embodiment, core 28 is made of carbon fibers and sheaths 30, 32 are made of glass fibers, such as E-glass fibers. Outer sheath 30 inhibits electrical conduction to the user through core 28 and also increases the durability and water resistance of shell 24. Inner sheath 32 prevents electrolytic corrosion between carbon fibers of core 28 and the aluminum of couplings 16.

Section 12 can include staggered re-enforcement loops (not shown) to increase the hoop strength of the section and resistance to profile deformation. Advantageously, sections 12 are lightweight to provide for ease of use. For example, each section 12 without coupling 16 secured thereto and having a length of about 5 feet (1.5 meters) and an outer diameter of about 1.8 inches (45 millimeters) has a weight of about 1 pound (0.44 kilograms). In addition, section 12 of this size and weight has a rigidity such that when the section is simple supported from the ends and a load of about 175 pounds (80 kilogram) is applied to the center, a maximum deflection of about 0.60 inches (15 millimeters) is generated.

Female and male portions 20, 22 of coupling 16 include a sleeve 34 that is secured over ends 36 of each section 12. Ends 36 can be reinforced to handle the localized loading imparted by coupling 16. Ends 36 are preferably secured in sleeves 34 by an adhesive such as an epoxy adhesive.

Pole 10 can include a bottom cap 38 for disposal on female portion 20 at the bottom of the pole. Bottom cap 38 can be threadably secured in female portion 20. Alternately, bottom cap 38 can be secured over or on female portion 20 in a snap fit arrangement. In this manner, bottom cap 38 can protect female portion 20 when pole 10 is placed on the ground and/or can increase the coefficient of friction between the bottom of the pole and the ground to mitigate sliding of the pole.

Coupling 16 is described with reference to FIGS. 3 through 7. Female and male portions 20, 22 each include a threaded section 40, 42, respectively, so that the portions can be threadably engaged with one another. Preferably, threaded sections 40, 42 are configured to be fully engaged with between about one to about two turns, with about one and a half turns being more preferred. In this manner, sections 12 can easily be connected and disconnected from one another by simply rotating adjacent sections 12 having female and male portions 20, 22 with respect to one another about one and a half turns.

Advantageously, coupling 16 is configured to mitigating instances of cross-threading of threaded sections 40, 42. Male portion 22 includes a first male guide 44 and a second male guide 46, where threaded section 42 is defined between the first and second male guides. Similarly, female portion 20 includes a first female guide 48 and a second female guide 50, where threaded section 40 is defined between the first and second female guides. First male and female guides 44, 48 have smaller diameters than threaded sections 40, 42. However, second male and female guides 46, 50 have larger diameters than threaded sections 40, 42.

First male guide 44 corresponds in size to first female guide 48 so that the first male guide is received in the first female guide. Moreover, second male guide 46 corresponds in size to second female guide 50 so that the second male guide is received in the second female guide.

Figure 5:
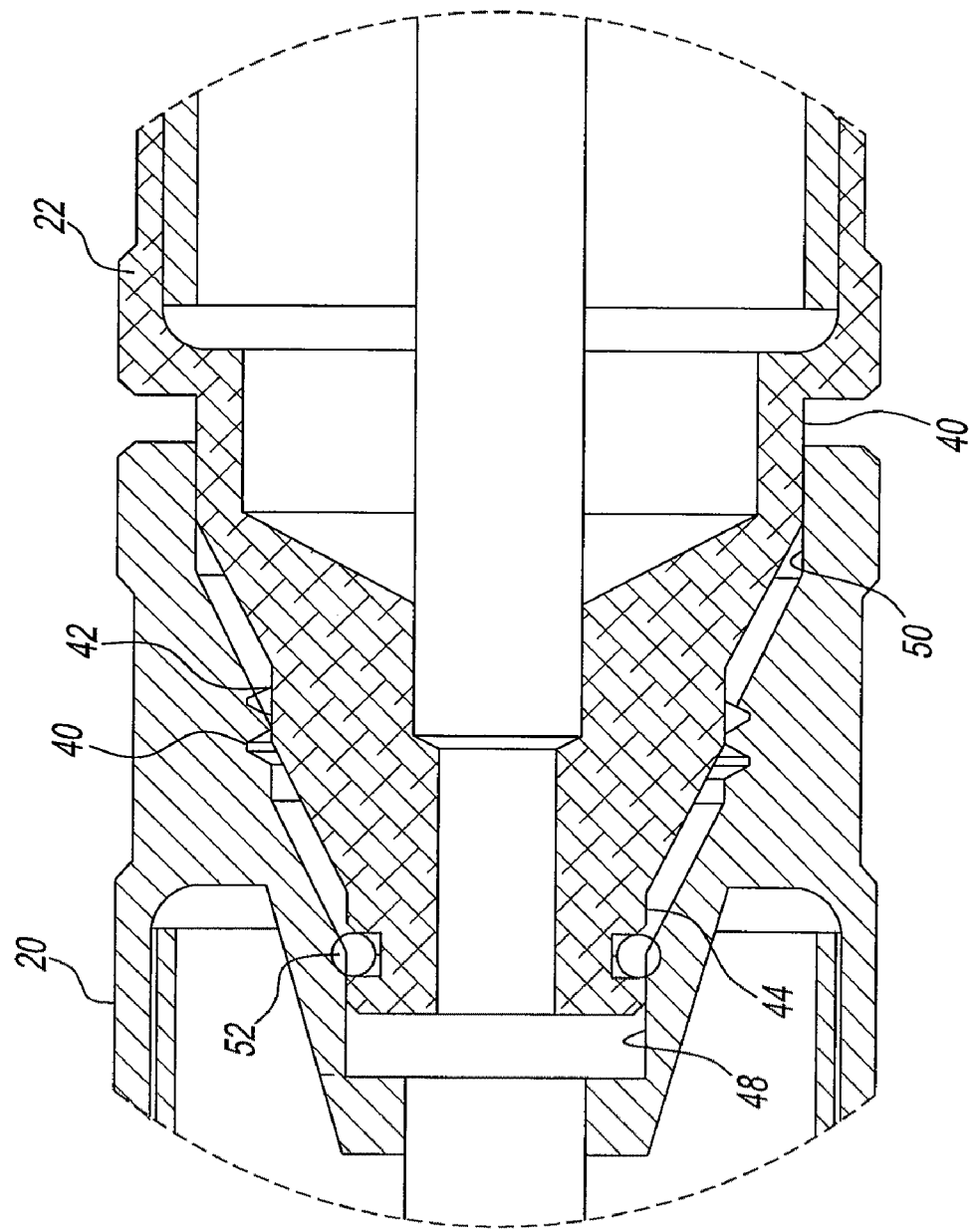
FIG. 5 is a view of FIG. 4 taken along circle A and illustrated without the water tube.

As best seen in FIGS. 4 and 5, first guides 44, 48 and second guides 46, 50 are spaced from one another and from threaded sections 40, 42 so that the first guides are engaged with one another and the second guides are engaged with one another before the threaded sections engage with one another. In this manner, the guides 44, 46, 48, 50 ensure that threaded sections 40, 42 are aligned before threadably engaging one another, which prevents the threaded sections from being inadvertently cross-threaded.

Figure 6:
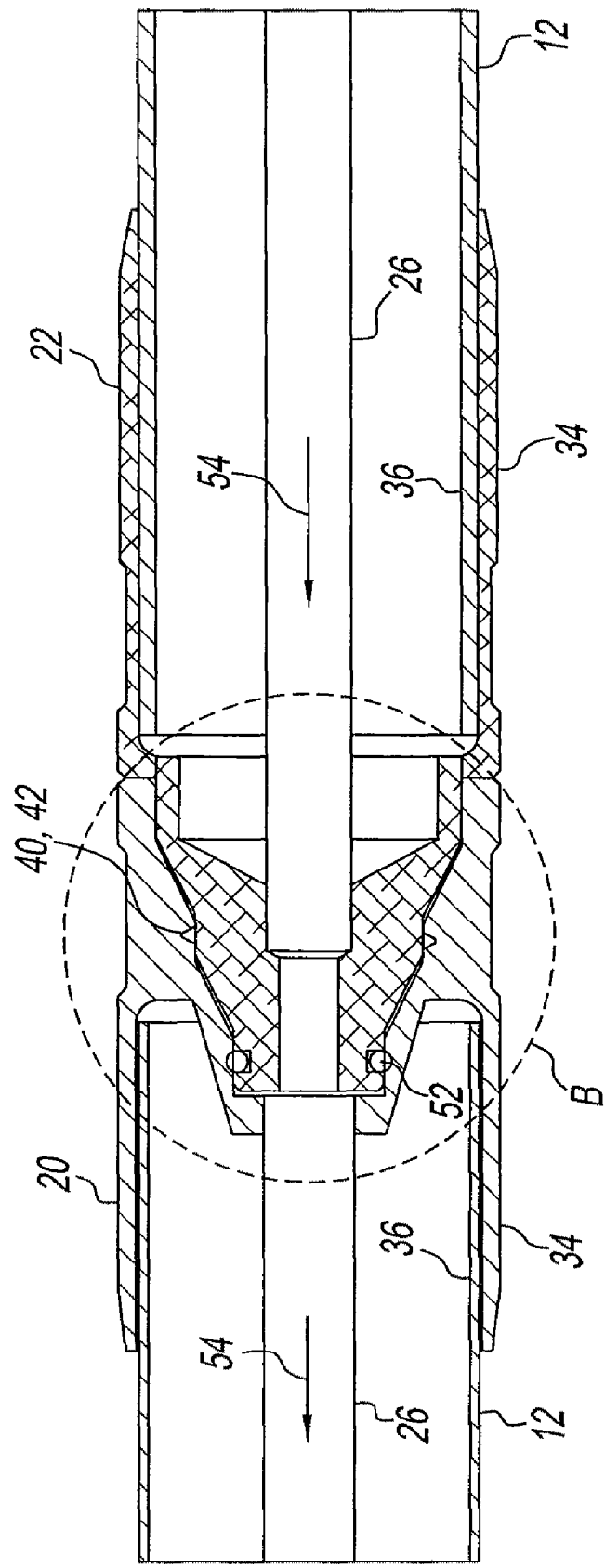
FIG. 6 is a sectional view of the coupling of FIG. 3 after engagement of the threaded sections.
Figure 7:
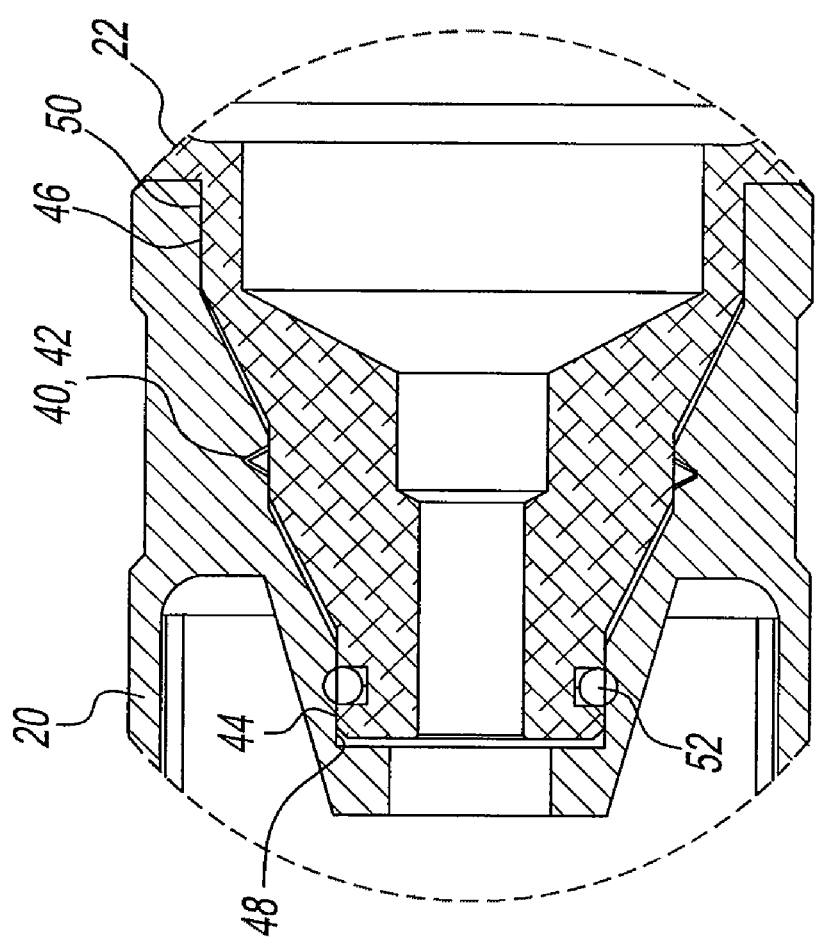
FIG. 7 is a view of FIG. 6 taken along circle B and illustrated without the water tube.
Figure 8:
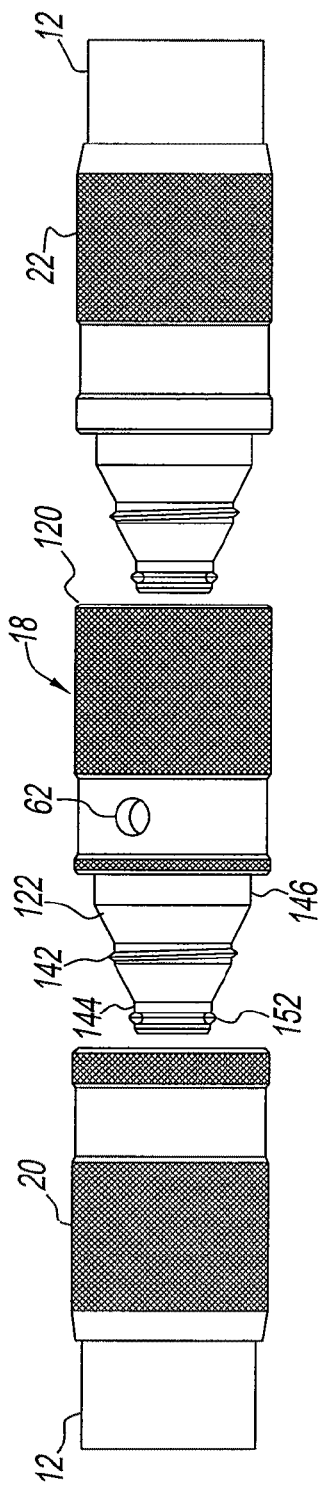
FIG. 8 is an exploded view of an exemplary embodiment of a water fed fitting according to the present disclosure for use with the pole of FIG. 1 and illustrated without the nipple or valve.

After aligning threaded sections 40, 42, female and male portions 20, 22 of coupling 16 are threadably engaged with one another as shown in FIGS. 6 and 7. Coupling 16 can include a sealing member 52 to form a water-tight seal between first male and female guides 44, 48 when female and male portions 20, 22 are threadably secured to one another.

Water tube 26 is secured to female and male portions 20, 22 so that water can be fed through coupling 16 in a flow direction 54 when the female and male portions are threadably engaged with one another.

Water fed fitting 18 is described with reference to FIGS. 8 through 11. Water fed fitting 18 is a type of coupling 16, which allows water to be fed into pole 10 and is configured for connection between two sections 12 by being removably connected to the female portion 20 of one section and the male portion 22 of another section.

Specifically, water fed fitting 18 includes a female portion 120 and a male portion 122, which are as described above with respect to female and male portions 20, 22 of coupling 16. For purposes of clarity, component parts performing analogous functions to those previously described are labeled in multiples of one hundred.

Female and male portions 120, 122 include threaded sections 140, 142. Thus, threaded section 140 in female portion 120 of water fed fitting 18 can be threadably engaged with threaded section 42 on male portion 22 of coupling 16. Similarly, threaded section 142 on male portion 122 of water fed fitting 18 can be threadably engaged with threaded section 40 in female portion 20 of the coupling. Female and male portions 120, 122 also include guides 144, 146, 148, 150 to ensure that threaded sections 40, 42, 140, 142 are aligned before threadably engaging one another, which prevents the threaded sections from being inadvertently cross-threaded.

Figure 9:
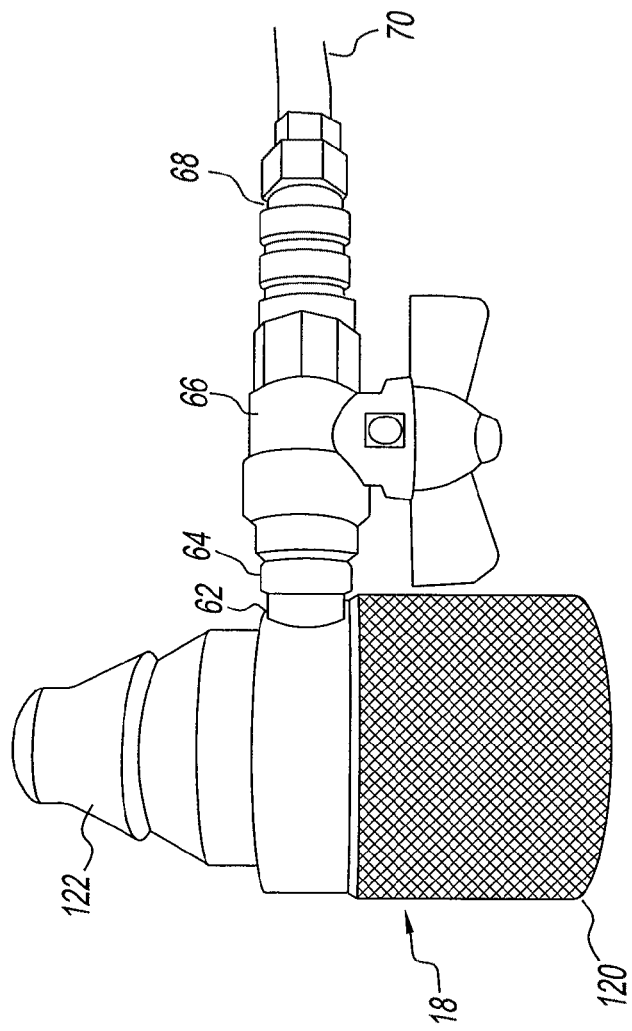
FIG. 9 is a side view of an exemplary embodiment of a water fed fitting according to the present disclosure for use with the pole of FIG. 1 and illustrated with the nipple or valve.
Figure 10:
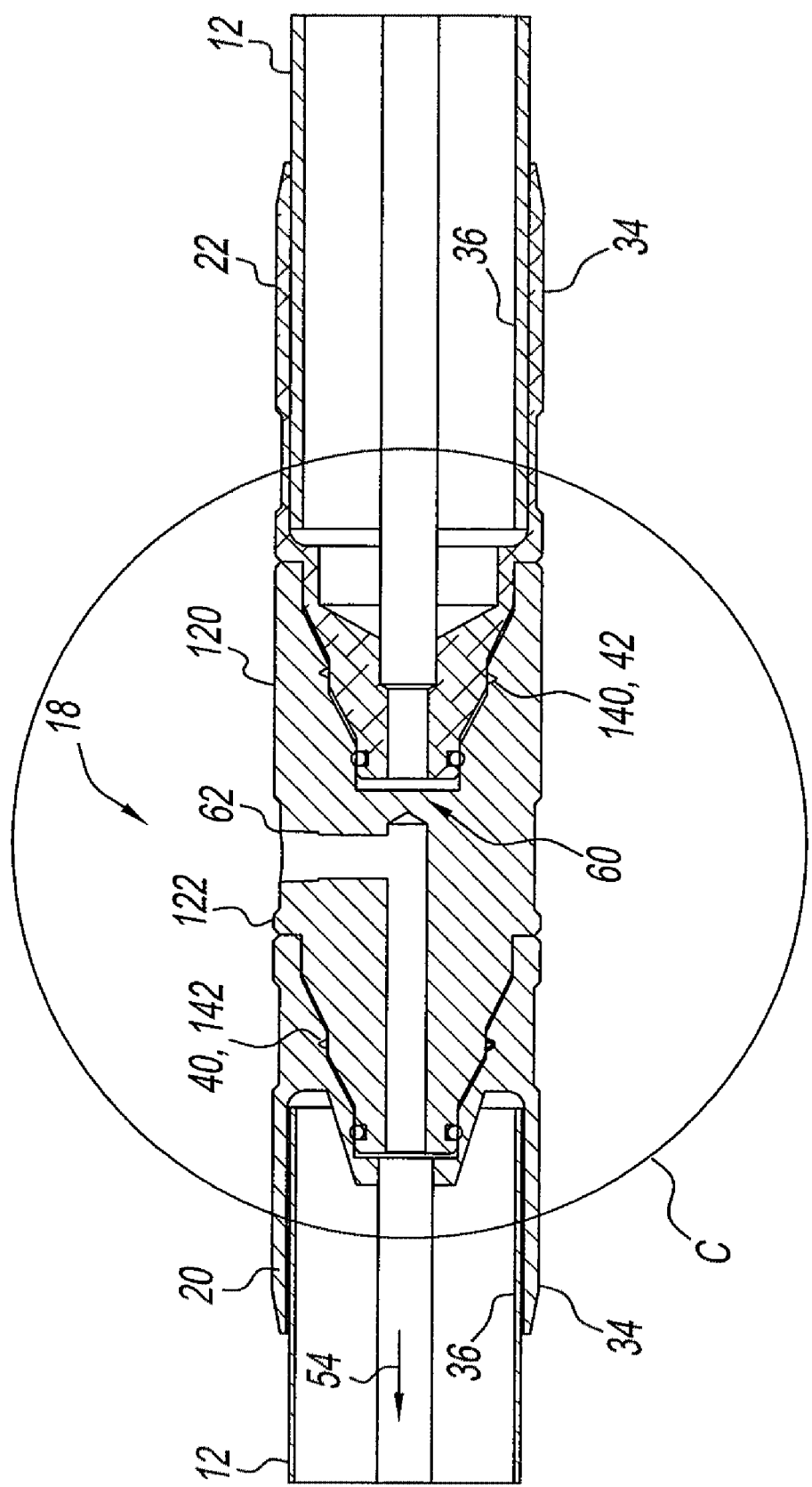
FIG. 10 is a sectional view of the fitting of FIG. 8 after engagement of the threaded sections.
Figure 11:
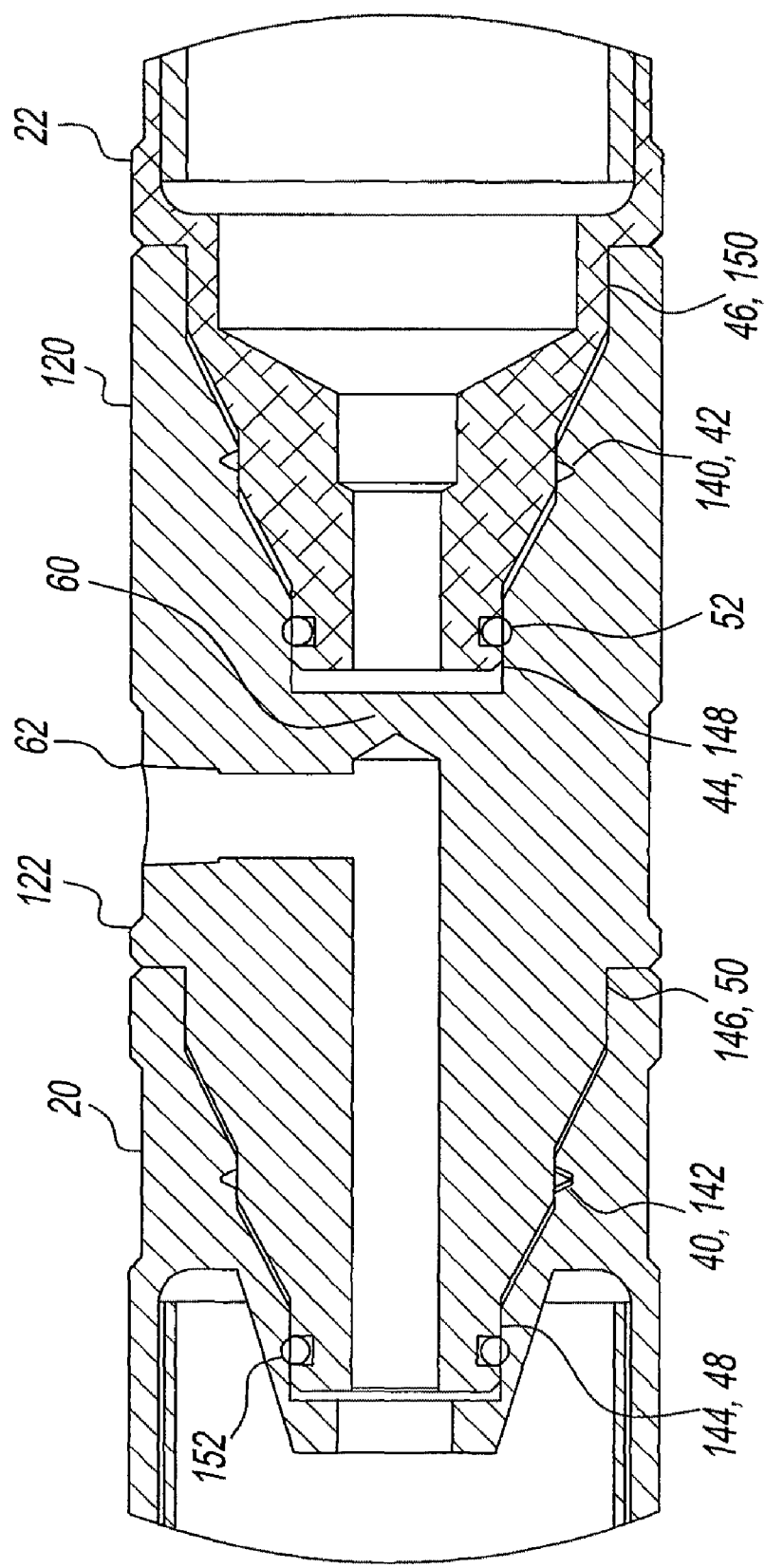
FIG. 11 is a view of FIG. 10 taken along circle C and illustrated without the water tube.

Water fed fitting 18 includes a water diverter 60, a port 62, a nipple 64, and a valve 66 (FIG. 9). Valve 66 can be connected via a quick disconnect 68 to a water conduit 70 in fluid communication with a water source (not shown). Accordingly, valve 66 can be used to selectively place cleaning implement 14 in fluid communication with the water source when the valve is connected to the water source via disconnect 68. In addition, valve 66 can be used to selectively drain water from pole 10 when disconnect 68 has been disconnected from water conduit 70.

Water diverter 60 is defined within water fed fitting 18 between female and male portions 20, 22. Port 62 is in fluid communication with male portion 20. Advantageously, water diverter 60 prevents fluid communication between port 62 and female portion 22. Thus, water diverter 60 allows water from conduit 70 to flow into water tube 26 through water fed fitting 18 in flow direction 54, without flowing in a direction opposite to the flow direction.

The interconnection of nipple 64, valve 66, and quick disconnect 68 to conduit 70 ensures that the conduit is maintained a predetermined distance 72 from fitting 18 and, thus, from pole 10. It has been determined that maintaining conduit 70 predetermined distance 72 from pole 10 can ensure that the conduit does not present a tripping hazard to the user of the pole.

The use of pole 10 will now be described with reference to FIG. 1. Cleaning implement 14 can be raised to a desired height by securing one or more sections 12 to the cleaning implement to form pole 10. Once pole 10 has the desired height, water fed fitting 18 can be secured to the bottom of the last section 12 and cap 38 can be secured to the fitting and/or to the bottom section 12. Next, valve 66 can be opened so that water flows from water source 70 to cleaning implement 14.

Since additional sections 12 can be secured to the bottom of water fed fitting 18, pole 10 can also improve the efficiency of the window cleaning process. As discussed above with respect to prior water fed poles, the bottom section of the pole has traditionally been used to feed water into the pole. Thus, at each point where a section of the assembled pole is removed, the cleaner must first disconnect the water feed, remove a pole section, and then reconnect the water feed to the bottom section.

The use of pole 10 having fitting 18 can mitigate these inefficiencies. Specifically, water fed fitting 18 can be placed at any selected position within pole 10 so that all sections 12 above the water fed fitting are water fed, while all sections 12 below the fitting are not water fed. In this manner, at each point in the cleaning process where the section 12 of pole 10 that needs to be removed is not a water fed section, the cleaner need only remove that section without needing to disconnect and reconnect to conduit 70.

Thus, pole 10 includes one or more sections 12 having female and male portions 20, 22 of coupling 16 secured thereto. Coupling 16 assists the user in aligning the threads of female and male portions 20, 22 to prevent incidents of cross threading. In addition, coupling 16 only requires one to two turns to engage female and male portions 20, 22, further speeding the process. When desired, pole 10 can include water fed fitting 18, which is a type of coupling 16 that includes diverter 60 and port 62 so that water can be fed into the pole in the desired flow direction 54. The use of water fed fitting 18 can further increase the efficiency of pole 10 by allowing the user to place sections 12 below the fitting so that, the cleaner need only remove specific at least some of sections without needing to disconnect and reconnect to conduit 70.

It should be recognized that pole 10 is illustrated in the exemplary embodiment having female portion 20 at the bottom of each section and male portion 22 at the top of each section. Of course, it is contemplated by the present disclosure for pole 10 to have female portion 20 at the top and male portion 22 at the bottom. In this embodiment, cleaning implement 14 would include a male portion 22, cap 38 would be configured for disposal on this male portion, and water fed fitting 18 would have port 62 defined so that the port is in fluid communication with the female portion.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A coupling for joining a first pole section and a second pole section, comprising:
   a male portion having a first male guide, a second male guide, and a first threaded section between said first and second male guides;
   a female portion having a first female guide, a second female guide, and a second threaded section between said first and second female guides;
   a water port being between said male and female portions;
   a water diverter being between said male and female portions so that said water port is in fluid communication with either said male portion or said female portion; and
   a valve secured to said water port, said valve be configured to selectively place the first pole section or the second pole section in fluid communication with a water conduit when said valve is connected to the water conduit.

2. The coupling as in claim 1, wherein said valve is configured to selectively drain water from the first pole section or the second pole section when said valve is not connected to the water conduit.

3. The coupling as in claim 1, wherein the water conduit is maintained a predetermined distance from the coupling.

4. A water fed pole comprising:
   a first pole section having a male coupling portion at a first end in fluid communication with a female coupling portion at a second end;
   a second pole section having a male coupling portion at a first end in fluid communication with a female coupling portion at a second end;
   a water fed fitting having a male coupling portion and a female coupling portion so that said water fed fitting is configured for connection between said first and second pole sections by removably connecting said male coupling portion of said water fed fitting to said female coupling portion of said first pole section and by removably connecting said female coupling portion of said water fed fitting to said male coupling portion of said second pole section;
   a water diverter between said male and female coupling portions of said water fed fitting so that first and second pole sections are not in fluid communication with one another; and
   a valve secured to said water port, said valve be configured to selectively place said male coupling portion of said water fed fitting in fluid communication with a water conduit connection.

5. The water fed pole as in claim 4, wherein said water fed fitting further comprises a water port in fluid communication with said male coupling portion of said water fed fitting.

6. The water fed pole as in claim 4, wherein said water fed fitting further comprises a water port in fluid communication with said female coupling portion of said water fed fitting.

7. The water fed pole as in claim 6, further comprising a valve secured to said water port, said valve be configured to selectively place said female coupling portion of said water fed fitting in fluid communication with a water conduit connection.

8. The water fed pole as in claim 4, wherein said water fed fitting is configured to maintain a water conduit a predetermined distance from said first and second pole sections.

9. A water fed pole comprising:
   a first pole section having a male coupling portion at a first end in fluid communication with a female coupling portion at a second end;
   a second pole section having a male coupling portion at a first end in fluid communication with a female coupling portion at a second end;
   a water fed fitting having a male coupling portion and a female coupling portion so that said water fed fitting is configured for connection between said first and second pole sections by removably connecting said male coupling portion of said water fed fitting to said female coupling portion of said first pole section and by removably connecting said female coupling portion of said water fed fitting to said male coupling portion of said second pole section;
   a water diverter between said male and female coupling portions of said water fed fitting so that first and second pole sections are not in fluid communication with one another; and
   a bottom cap configured for connection to said female coupling portion of said second pole section.

10. A water fed fitting comprising:
    a first coupling portion at a first end;
    a second coupling portion at a second end;
    a water port in fluid communication with said first coupling portion;
    a water diverter preventing fluid communication between said water port and said second coupling portion; and
    a valve secured to said water port, said valve be configured to selectively place said first coupling portion in fluid communication with a water conduit connection.

11. The water fed fitting as in claim 10, wherein said first coupling portion is a male coupling portion and said second coupling portion is a female coupling portion.

12. The water fed fitting as in claim 11, wherein said male coupling portion comprises a first male guide, a second male guide, and a threaded section between said first and second male guides.

13. The water fed fitting as in claim 11, wherein said female coupling portion comprises a first female guide, a second female guide, and a first threaded section between said first and second female guides and wherein said male coupling portion comprises a first male guide, a second male guide, and a second threaded section between said first and second male guides.

14. The water fed fitting as in claim 10, wherein said first coupling portion is a female coupling portion and said second coupling portion is a male coupling portion.

15. The water fed fitting as in claim 14, wherein said male coupling portion comprises a first male guide, a second male guide, and a threaded section between said first and second male guides.

16. The water fed fitting as in claim 14, wherein said female coupling portion comprises a first female guide, a second female guide, and a first threaded section between said first and second female guides and wherein said male coupling portion comprises a first male guide, a second male guide, and a second threaded section between said first and second male guides.

* * * * *